Sept. 14, 1926.

C. W. SHAIFER 1,600,071

BEARING FOR THE MOVING ELEMENTS OF MEASURING DEVICES AND THE LIKE

Filed March 17, 1925

Inventor
Charles W. Shaifer
by
His Attorney

Patented Sept. 14, 1926.

1,600,071

UNITED STATES PATENT OFFICE.

CHARLES W. SHAIFER, OF SCHENECTADY, NEW YORK, ASSIGNOR TO GENERAL ELECTRIC COMPANY, A CORPORATION OF NEW YORK.

BEARING FOR THE MOVING ELEMENTS OF MEASURING DEVICES AND THE LIKE.

Application filed March 17, 1925. Serial No. 16,262.

The present invention relates to bearings for the moving elements of measuring devices and the like, and has for its object the provision of an improved bearing means for devices of this character, in which bearing means the effects of friction are eliminated and by which friction losses are prevented from influencing the accuracy of the measurement indications of such devices.

In work measuring devices, for example, such as dynamometers, the bearing friction of the moving parts, especially that of relatively slowly and intermittently moving parts, appreciably affects the accuracy of the measurement indications of the same by absorbing a comparatively large proportion of the force or torque to be measured. This is particularly noticeable in measuring and indicating devices in which the moving elements are of relatively massive structure.

Heretofore such friction losses have been reduced, to a certain extent, by the use of knife-edge bearings, ball bearings and other well known means for this purpose, each of which has been found subject to certain disadvantages and to have certain limitations in use. For example, ball bearings, such as are commonly used as the trunnion bearings of a dynamometer, introduce a certain static and rolling friction which causes the dynamometer to be sluggish or sticky in its action and affects the accuracy of the torque values measured by it.

In accordance with the invention, a bearing is provided which operates in such a manner that the friction losses are balanced out and do not affect the accuracy of the measuring device in which it is used. By way of example, the invention is herein described and illustrated in connection with an electrical dynamometer, and for a consideration of what is believed to be novel and the invention, attention is now directed to the accompanying drawing, description thereof and the appended claims.

Figure 1:
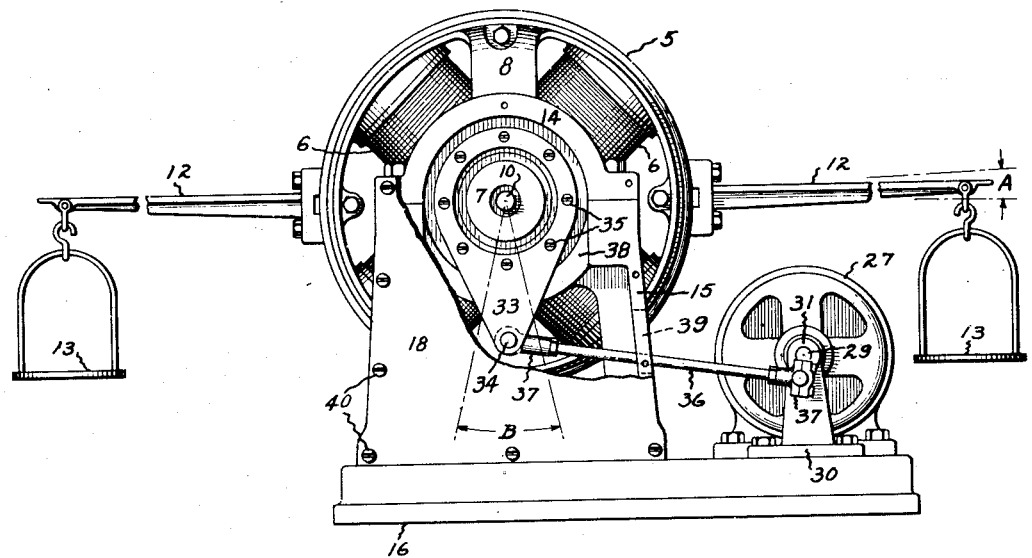
Figure 2:
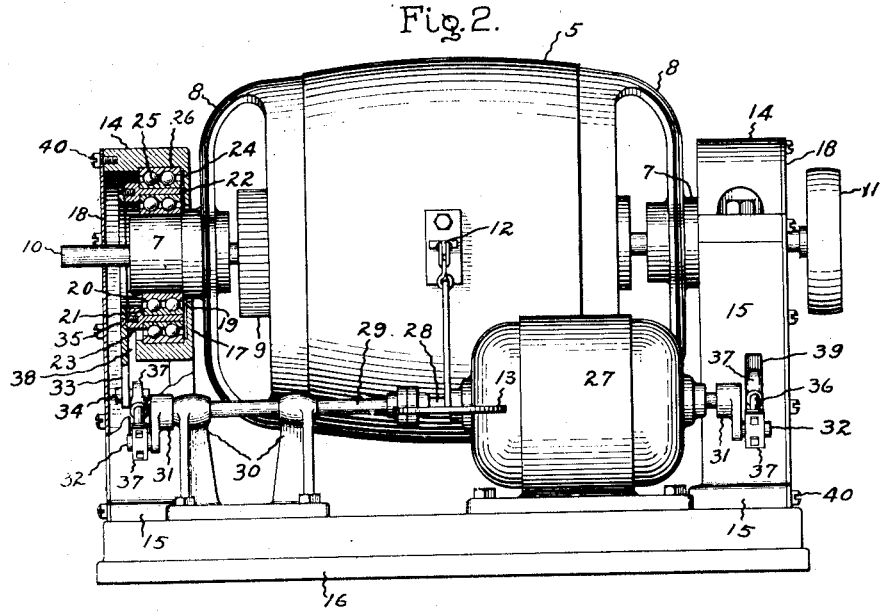

In the drawing, Fig. 1 is an end view of a dynamometer as above referred to, provided with trunnion bearings embodying the invention, and Fig. 2 is a side view, partly in section, of the device shown in Fig. 1.

Referring to the drawing, 5 is the outer shell or frame of a dynamo electric machine which forms the usual operation element of a dynamometer of the electrical type. This comprises field magnets 6 carried by the shell, end bearings 7 carried by webs 8 integral with the shell and a rotor or armature 9 mounted on a shaft 10 which is journaled in the end bearings 7. The shaft is provided at one end with a suitable coupling 11 through which it may be connected with a source of power, the torque of which is to be measured or a device for which a measure of the power to drive it is required.

As is well understood, the operation of the dynamometer is such that the driving torque applied to shaft 10 is transmitted by the rotating armature 9 to the shell 5 through the electromagnetic coupling which is set up between said armature and the field magnets 6 carried by the shell. The latter is mounted to rotate or oscillate in trunnion bearings, which are coaxial with the shaft 10 in either direction as impelled by the electromagnetic coupling.

The tendency of the shell to move may be measured by any suitable means connected with it, as an indication or measure of the torque. In the present example said means comprises the usual radial torque arms 12 secured to the shell at diametrically opposite points and weight platforms 13 suspended therefrom adjacent their outer ends. The platforms are then suitably weighted to balance the shell against the force tending to move it, and the weight value is used as an indication of said force or torque, as is well understood.

Located at each end of the shell 5 and surrounding the end bearings thereof, are trunnion bearing housings 14 which are carried by bearing pedestals 15. The latter are secured to a supporting base 16 in positions to bring the housings 14 into spaced, axially-aligned relation with each other. The housings are closed at their inner ends by centrally perforated integral webs 17 through which the end bearings extend and at their outer ends by detachable cover plates 18 which extend downwardly to the base.

Within each housing and surrounding the end bearing therein is a bearing means comprising an inner ball bearing 19 having radially inner and outer ball races or bearing surfaces 20 and 21 respectively, a sleeve 22 having a thickened outer edge 23, and an outer ball bearing 24 having radially inner and outer ball races or bearing surfaces 25 and 26 respectively.

The inner ball bearing 19 is pressed onto the end bearing 7 of the shell which is adapted to receive it, so that the inner race 20 is carried by the shell and forms its bearing surfaces. The outer race 21 of ball bearing 19 is pressed into the sleeve 22 and the inner ball race 25 of ball bearing 24 is pressed onto the sleeve 22. The outer ball race 26 of ball bearing 24 is seated in an annular groove in the bearing housing 14 which serves to hold the concentric bearing arrangement thus formed concentric with the shaft 10.

The outer ball bearing 24 forms a bearing for the sleeve 22, permitting it to be rotated or oscillated, while the inner ball bearing 19 forms the trunnion for the shell 5, that is, for end bearing which forms a hub for said shell. The sleeve 22 is thus a movable carrier for one surface of the trunnion bearing. By oscillating the sleeve 22 it will be seen that the outer trunnion bearing surface 21 may be oscillated with respect to the inner trunnion bearing surface 20. For either direction of rotation of the armature 9, with this arrangement the trunnion bearing friction is alternately added to and subtracted from the torque applied to the shell or measuring element 5.

As a convenient means for oscillating the sleeve 22, a small electric motor 27 is provided on the base 16 with its shaft 28 parallel with the dynamometer shaft 10. The motor shaft is extended at one end as indicated at 29 and the extension is provided with suitable bearing 30 mounted on the base 16. The motor shaft extends from its casing a short distance at the opposite end, and on this end and the free end of the extension shaft 29 are secured short crank arms 31 provided with crank pins 32.

The oscillating sleeve 22 for each trunnion bearing is provided with a lever 33 in the form of a plate which fits over the enlarged outer end 23 of the sleeve and extends downwardly therefrom to carry pivot pin 34 at its lower end. The lever for each trunnion bearing is secured to the sleeve by screws 35 spaced about the face of the same and is connected with the adjacent crank arm 31 by a connecting rod 36 having suitable bearing heads 37 which fit over the pivot pin 34 on said lever and the crank pin 32 on the crank arm.

With the motor in operation, the throw of the crank pins 32 is transmitted to the levers connected with them and causes the trunnion bearing surfaces to be oscillated at a periodicity which depends upon the speed of the motor 27 and through an arc or length of travel depending upon the throw of the crank pins 32 and the length of the levers 33. The speed of the motor may be chosen to give any desired rate of oscillation, which is preferably relatively high for reasons hereinafter pointed out, and by properly relating the crank pin throw to the length of the lever connected with it, any desirable length of bearing travel may be obtained.

In the arrangement shown the lower wall of each bearing housing is recessed as indicated at 38 to provide a clearance space for the lever 33 so that it may swing freely through its full operating arc. Each connecting rod may then pass through an opening 39 in the side of the bearing pedestal and connect with the lever within the confines of the pedestal. This permits the major portion of the oscillating mechanism for each trunnion bearing to be enclosed and protected when the cover plates 18 are in place. The latter are fastened in place against the pedestal and bearing housing by screws 40 suitably spaced about their peripheries.

From the foregoing it will be seen that, in accordance with the invention, the trunnion bearings in which the measuring element or shell moves, are provided with bearing surfaces which are, by suitable means, oscillated at a high periodicity. Due to the oscillations, the trunnion bearing friction is alternately added to and subtracted from the torque transmitted to said measuring element or shell. Assuming this friction to be constant for both directions of rotation, the torque which the dynamometer is measuring is affected as follows:

Let $T$ = the torque transmitted to the dynamometer shell.

Let $F$ = the total trunnion bearing friction.

Let $P$ = the actual torque or measured pull on the dynamometer shell.

With a forward oscillation $P = T + F$.

With a backward oscillation $P = T - F$.

Adding these equations $2P = 2T$ or $P = T$.

This shows that the actual torque or measured pull on the dynamometer shell is the true torque transmitted to it when the oscillating type of trunnion bearing of the present invention is used in connection with it. Thus the friction which exists in the bearing means for the measuring element is eliminated or balanced out of the measurement indication automatically by providing in connection therewith suitable oscillating bearing surfaces, the rate of movement or oscillation of which is relatively high.

The rate at which the trunnion bearings are oscillated must be relatively high in order that the alternations of bearing friction may not result in pulsations in the dynamometer torque. The rate of movement or oscillation of the bearing surfaces depends upon the mass or inertia of the part or element which moves on said bearing surfaces and to a certain extent upon the bearing friction. In general, the lower the bearing friction between the moving part and the oscillating bearing surfaces and the greater the mass or inertia of the moving part, the lower may be the rate of bearing movement or oscillation without setting up pulsations.

In the present example, it will be seen that while the bearing friction has been materially reduced by using ball bearings, a certain bearing friction will still exist. With the moving shell limited to a short arc of movement, indicated at A, as it is in actual use, the bearing friction tends to render the shell "sticky" or sluggish in movement, as hereinbefore mentioned.

Assuming now that the sleeve 22 of the oscillating bearing is oscillated at a very low rate to oscillate the bearing surface connected therewith, the bearing friction, while slight, permits a certain portion of the force with which the oscillating sleeve or bearing surface is moved to be transmitted to the shell. If the rate is sufficiently low the shell will respond and will follow the movement of the bearing surface. This results in pulsations in the torque when the dynamometer is in use.

If the rate of oscillation of the bearing surface is now gradually increased, a certain rate will be reached at and above which, the moving element or shell, because of its mass or inertia, will no longer respond to the oscillating movement of the bearing surface and will appear to float on the bearing surface. Any force, such as the dynamometer torque, applied to the shell, will then cause it to move in response to said force independently of the bearing friction, the bearing friction being balanced out as explained in connection with the foregoing equation.

The bearing surface must, therefore, alternately move with and against the movement of the member for which it is provided at a rate sufficiently high, that is, with a relatively high periodicity, to prevent the member from responding to the movement. In the present example, the speed of the motor may be varied to set up the desired rate of movement, and since the dynamometer shell is of relatively great mass and provided with ball bearings, the rate of oscillation, while relatively high, is not as high as it would be in an instrument having a moving measuring member of lesser mass and not provided with ball bearings.

In the device of the present example, the crank arms 31 are indicated as being set on the motor shaft so that they move in synchronism with each other and cause the bearing surfaces to oscillate in synchronism with each other, that is, together and in the same direction at the same time. In this case, the total bearing friction F, of the equation hereinbefore explained, is the combined friction of both trunnion bearings. The shell thus tends to move in response to the force transmitted through the total bearing friction but is prevented from doing so by its inertia as above pointed out.

In certain instruments having two bearings, such as a dynamometer for example, it has been found desirable under certain conditions to cause the bearing surfaces to move or oscillate in opposition, that is, 180 degrees out of synchronism with each other. This reduces the effect of the total bearing friction to the difference between that of the one bearing and that of the other. As this difference is usually low and may nearly, if not quite, approach zero with duplicate bearings, the effect of bearing friction in its tendency to produce pulsations is materially reduced. In this case the total bearing friction F, above mentioned, is the difference between the friction of one bearing and the other, instead of the sum, as in the case of the synchronous oscillation or movement.

In the dynamometer shown, the bearings may be put into opposition in their movement by resetting one crank arm 31 so that its crank pin 32 is diametrically opposite on the motor shaft to the crank pin of the other crank arm.

In any case, however, it will be seen that the total bearing friction, whether it be the sum or difference of the friction of a plurality of bearings or that of a single bearing, is rendered ineffective in its influence upon the operation of the movable measuring element for which said bearings provide a support, by oscillating or moving the bearing surface of each bearing alternately with and against the movement of the element at a certain relatively high rate.

From the foregoing it should not be assumed that the ball bearings shown in the present illustration are essential to the operation of a bearing in accordance with invention. Any bearing may be used, the bearing surface of which may be moved alternately with and against movement of the member it supports. The concentric ball bearing arrangement shown facilitates assembly, serves to eliminate friction, and thereby reduce the power required to oscillate the bearings.

It is desirable in devices such as the dynamometer shown, in which the measuring element moves through a short arc, or is otherwise limited in its travel, to cause the bearing to move between wider limits or overtravel the measuring element. In the device shown, the shell is permitted to move through a short arc A, this limited movement being sufficient to obtain a balanced indicating position for measurement readings, as is well understood.

Through the proper relation of the parts comprising the motor means and providing the oscillatory movement as hereinbefore pointed out, the oscillating sleeves of the trunnion bearings are carried through an arc B which is greater than arc A, whereby the sleeves overtravel the movement of the shell. This prevents the bearing wear from being localized and results in more accurate operation over long periods.

It is possible also to remove screws 35 which hold arms 33 to the sleeves 22, rotate the sleeves 22 and the ball-races carried by them to new positions and again secure the arms to the sleeves in the new positions, as a means for taking up any bearing wear and further preventing the effects of localized wear.

While the invention has been herein illustrated and described in connection with what is at present considered to be its best embodiment, it should be understood that it is not limited thereto and may be carried out by other means.

What I claim as new and desire to secure by Letters Patent of the United States is:—

1. The combination with a bearing providing bearing surfaces for an element which moves between certain limits, of means for moving one of said bearing surfaces alternately with and against the movement of said element between limits of movement exceeding those between which said element moves.

2. The combination with a bearing providing bearing surfaces for a movable element, of means for moving one of said bearing surfaces alternately with and against the movement of the element at a rate sufficiently high to prevent the movable element from responding to said movement.

3. The combination with a bearing providing bearing surfaces for a movable element, of means for moving one of said bearing surfaces alternately with and against the movement of the element at a rate sufficiently high to prevent the movable element from responding to said movement, said means comprising a carrier for said bearing surface, and a motor device connected with said carrier for imparting thereto said alternating movement.

4. The combination with a bearing having a bearing surface and a member which moves thereon between certain limits, of means connected with the bearing which moves said bearing surface alternately with and against the movement of said member between limits of movement exceeding those between which said element moves.

5. The combination with a bearing having a bearing surface and a movable member which moves thereon between certain limits, of means connected with the bearing which moves said bearing surface alternately with and against the movement of said member between limits exceeding the limits of movement of the member and at a rate sufficiently high to prevent the member from responding to the movement of the bearing surface.

6. In a precision instrument, a bearing for a moving element thereof which element moves between certain limits, comprising a bearing housing, means therein providing a bearing surface for said moving element, a movable carrier for said means supported by the housing, and motor means connected with the carrier which operates to impart thereto a vibratory movement in the direction of movement of the moving element of an amplitude exceeding the limits of movement of the moving element.

7. In a precision instrument, a bearing for moving element thereof, comprising a bearing housing, a bearing means secured to the housing, a second bearing means secured to the moving element, a movable member interposed between and secured to said bearing means, and motor means connected with said member for imparting thereto a vibratory movement in the direction of movement of the moving element.

8. In a measuring instrument a bearing means for a moving element thereof, comprising a bearing member carried by said element providing a bearing surface, a second bearing member providing a bearing surface in operative relation with that of the first-named bearing member, and motor means connected with the second bearing member which operates to move the same alternately in opposite directions while said bearing surfaces are in such operative relation.

9. In a measuring instrument, the combination with a part thereof which is capable of rotative movement, of a bearing in which said part rotates between certain limits, said bearing providing a bearing surface for said rotatable part, which bearing surface is movable concentrically and in contact with the rotatable part between limits of movement exceeding those of said part, and motor means connected with the bearing which oscillates said bearing surface between its limits of movement.

10. The combination in a dynamometer having a rotor and a member which moves in response to movement of the rotor coaxially with said rotor, of a bearing having a bearing surface on which said member moves, and means connected with said bearing which moves the bearing surface alternately with and against the movement of said member.

11. The combination in a dynamometer having a rotor and a member which moves in response to movement of the rotor coaxially with said rotor between certain limits, of a bearing having a bearing surface on which said member moves, and means connected with said bearing which moves said bearing surface alternately with and against the movement of said member between limits exceeding those between which the member moves.

12. The combination in a dynamometer having a rotor and a member which is capable of oscillatory movement coaxially with the rotor, of trunnion bearings for said member having bearing surfaces on which said member oscillates, and means connected with said bearings which imparts to said bearing surfaces an oscillatory movement of relatively high periodicity.

13. The combination in a dynamometer having a rotor, an outer shell, and means forming cylindrical end hubs for the shell on which it moves coaxially with the rotor in response to movement of said rotor, of trunnion bearings for said shell comprising supporting bearing housings into which said hubs extend, bearings within and carried by the housings in which the hubs move, said bearings being capable of oscillatory movement about said hubs, and motor means connected with said bearings for imparting thereto said oscillatory movement.

14. In a dynamometer, the combination with an element thereof which is capable of rotative movement between certain limits, of a bearing means therefor, comprising a supporting housing into which the element extends, an annular bearing having an inner member secured to the movable element and an outer member supported by and rotative within the housing, and motor means connected with the outer member, which means oscillates said member between limits of movement exceeding those of the movable element.

In witness whereof, I have hereunto set my hand this 16th day of March, 1925.

CHARLES W. SHAIFER